(12) United States Patent
Lee (10) Patent No.: US 10,508,399 B1
(45) Date of Patent: Dec. 17, 2019

(54) SUBSEA GAP SELF-REDUCING GROUT SEAL

(71) Applicant: James Jun Lee, Richmond, TX (US)

(72) Inventor: James Jun Lee, Richmond, TX (US)

( * ) Notice: Subject to any disclaimer, the term of this patent is extended or adjusted under 35 U.S.C. 154(b) by 0 days.

(21) Appl. No.: 16/141,980

(22) Filed: Sep. 26, 2018

(51) Int. Cl.
*E02B 17/00* (2006.01)
*F16J 15/10* (2006.01)
*E02D 27/52* (2006.01)

(52) U.S. Cl.
CPC ......... *E02B 17/0008* (2013.01); *F16J 15/104* (2013.01); *E02D 27/525* (2013.01)

(58) Field of Classification Search
CPC ..... E02B 17/0008; E02D 27/52; E02D 5/526; E02D 27/525; F16J 15/00; F16J 15/104
See application file for complete search history.

(56) References Cited

U.S. PATENT DOCUMENTS

| | | | | | |
|---|---|---|---|---|---|
| 4,063,421 | A | * | 12/1977 | Coone | E02B 17/0008 405/225 |
| 4,077,224 | A | * | 3/1978 | Coone | E02B 17/0008 405/225 |
| 4,171,923 | A | * | 10/1979 | Landers | E02B 17/0008 405/225 |
| 4,968,184 | A | * | 11/1990 | Reid | E02B 17/0008 405/195.1 |
| 5,385,432 | A | * | 1/1995 | Kiyomiya | E02B 3/06 405/204 |
| 7,300,229 | B1 | * | 11/2007 | Fyfe | E02D 5/60 405/211 |
| 2010/0148452 | A1 | * | 6/2010 | Westhoff | E03F 3/04 277/605 |
| 2016/0032550 | A1 | * | 2/2016 | Lee | E02D 5/526 285/369 |
| 2017/0241095 | A1 | * | 8/2017 | Lee | E02B 17/0008 |

* cited by examiner

*Primary Examiner* — Carib A Oquendo
(74) *Attorney, Agent, or Firm* — Liu Law Group PLLC (57) ABSTRACT

A general purpose passive annular grout seal assembly is disclosed which is suitable both for offshore jacket installations with regular annular gap sizes and for offshore wind turbine structure installations with an extraordinarily large annular gap of any sizes. Grout self-sealing operation during grouting is conducted in two steps: 1) a gap reducing action enabled by a gravity differential pressure force induced tilting of a plurality of flip plates, and 2) a gravity differential pressure force induced sealing action for the remaining small gaps. This disclosed new type of grout seal can not only enhance grout seals' overall system reliability by eliminating all potential sources for harmful results known to the offshore industry, but also significantly reduce costs for fabrication, transportation, and installation of grout seals.

32 Claims, 9 Drawing Sheets

SUBSEA GAP SELF-REDUCING GROUT SEAL

FIELD OF THE INVENTION

The disclosure relates generally to an offshore structure installation device employing a subsea grout seal for sealing an annular gap subject to being filled with grout against a high column of concrete during the grout hardening period.

BACKGROUND OF THE INVENTION

Figure 1:
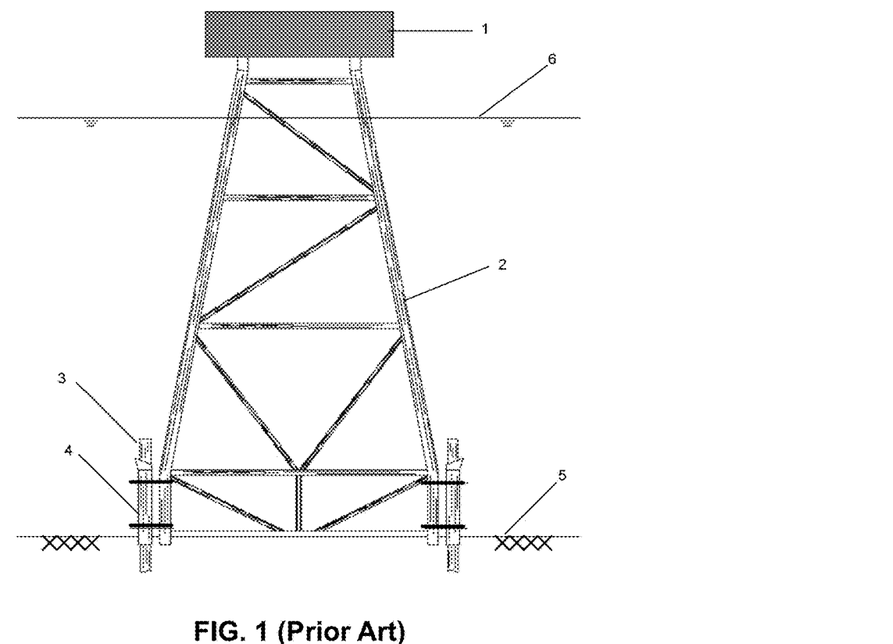
FIG. 1 is an elevation view of a deepwater offshore platform with extended legs from water surface to sea floor and with a plurality of pile sleeves for housing piles.

In an offshore structure installation such as a jacket installation or a wind turbine structure installation, a subsea grout seal is typically utilized to seal an annular gap between a sleeve structure inner surface and an outer surface of a tubular structure, such as a pile or a supporting leg, inside the sleeve structure against a high column of concrete during the grout hardening period. FIG. 1 illustrates a deepwater offshore platform with extended legs from water surface to sea floor and a plurality of pile sleeves for housing piles. As shown in FIG. 1, an offshore platform deck 1 is supported by a jacket 2 extended from water surface 6 to sea floor 5. A plurality of pile sleeves 4 are attached to the bottom of the extended legs to house a plurality of piles 3, which are driven into sea floor 5 to provide the anchoring to the platform. Grout seals are installed at the bottom of sleeve 4 inner surfaces.

Offshore platform installations have had more than 60 years' history. Acceptable pile offsets, or acceptable annular gaps between a sleeve inner surface and a pile outer surface during pile driving, have been gradually developed and standardized in the industry. The typical maximum annular gap for a deepwater jacket is about 2~3 inches (about 51~76 mm). A gap size of an inflatable packer for a jacket installation usually refers to the width between a packer inner surface before and after a grouting operation. For a passive grout seal, the gap usually refers to the width between steel annular structure inner surface, such as a planar annular plate inner surface, and the pile outer surface.

For an offshore jacket installation, a subsea grout seal is usually located at the bottom of a pile sleeve 4 inner surface near sea floor, below a plurality of pre-installed tapered guide shim plates. The seal has to be rugged and highly reliable because any seal failure such as grout leaking could cause the connection failure between a pile sleeve and a pile. Consequently, it could result in the foundation failure of the platform.

Figure 2:
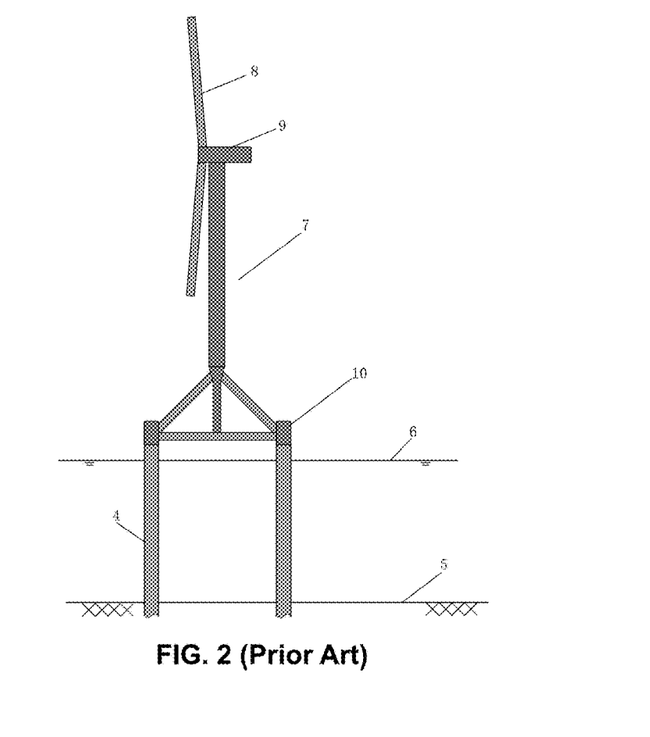
FIG. 2 is an elevation view of an offshore wind turbine structure with driven sleeves and a multi-leg support structure.

An offshore wind turbine structure is usually composed of two parts: 1) the upper part comprising a generator and turbine blades, and 2) the bottom part including a structural support base including a single leg base or a multi-leg base with multiple supporting legs. FIG. 2 illustrates an offshore installed wind turbine structure 7 with a generator 9 and a plurality of turbine blades 8 supported by a multi-leg base 10. In this configuration, a sleeve structure is individually driven into seabed 5 and serves as a sleeve 4 above water surface 6 for housing each supporting leg of the multi-leg base 10. A grout seal is typically installed at the bottom of each supporting leg outer surface, which is different from the offshore jacket installation mentioned earlier. Because there are no pile driving activities during wind turbine structure installation, no mud wiper is needed. In addition, offshore wind turbine structure installations usually occur in a shallow water area with smaller waves than in deepwater during installations, as well as less wave induced dynamic motions between installed sleeves 4 and supporting legs of a multi-leg base 10.

Because each sleeve 4 is individually driven, desired dimensional control between any two driven sleeves 4 is very difficult to achieve. As a result, the allowable gaps between one sleeve 4 inner surface and one inserting leg 3 outer surface will certainly become much larger than the gaps typically used for an offshore jacket installation mentioned earlier. To be specific, the resultant gap width can be as wide as one foot (about 300 mm). No existing subsea grout seals are able to handle such large gaps.

Existing Grout Seals for Offshore Jacket Installation

Until recently, most subsea grout seals have been designed only for offshore jacket installations. And in general, there are two types of grout seals for pilings in offshore jacket installations: 1) an active type such as an inflatable packer, and 2) several passive types such as a CRUX grout seal or a mechanical grout seal.

Inflatable Packer for Offshore Jacket Installation

Figure 3:
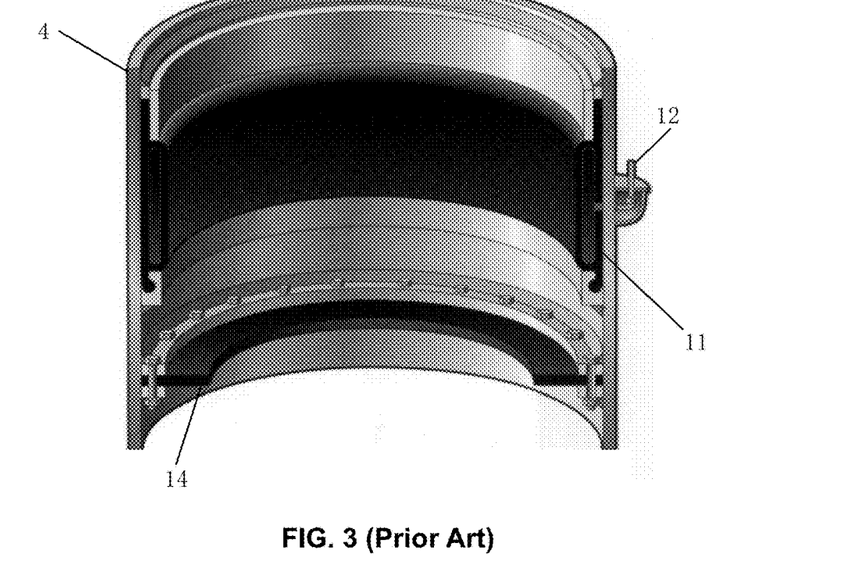
FIG. 3 is an ISO cut-off section view of a typical inflatable packer used as an active grout seal with a mud wiper below.

Inflatable packer was introduced to offshore industry in the 1970's and it has been widely utilized in offshore platform installation fields since then. Today, inflatable packers still occupy a very large grout seal market share, especially in deepwater jacket installation applications. Inflatable packer is an active device employing a control system and a power system located above water to activate the seal during grouting operation by injecting high pressure air to perform the grout sealing function. FIG. 3 is an ISO cross section view of a typical inflatable packer used as a subsea grout seal. As an active seal, the seal element is in a retracted position without a contact between the packer inner surface and a pile outer surface during pile inserting, lowering, and driving. As shown in FIG. 3, an inflatable packer element 11 is fixed to the inner surface of a sleeve 4 in a non-inflated condition, and an air injection tubing 12 is attached at the outer surface of the sleeve 4. To prevent mud at sea floor from polluting the annulus space during pile driving, a mud wiper 14 is usually installed below the packer element 11.

All subsea grout seals utilized for offshore jacket installation have two distinguished operational sections throughout a jacket installation process. Each section has its main concerns for potential damages to grout seals. For example, the first section is for various activities before grouting action, such as pile inserting, lowering and driving. The second section is for a grouting action. The uniqueness of the above-mentioned inflatable packer system is its configuration in the first section, in which the packer element 11 is in a retracted position to avoid any contact with the pile. However, the second section is a problematic one to cause some system reliability concerns. To be specific, such concerns include potential damages of a long-distance and high-pressure piping subsystem, and malfunction of the complicated control subsystem and the power package. In addition, an inflatable packer assembly has a significant higher cost than existing passive grout seals due to high costs in assembly fabrication, yard installation and yard testing.

Passive Seals for Offshore Jacket Installation

Figure 4A:
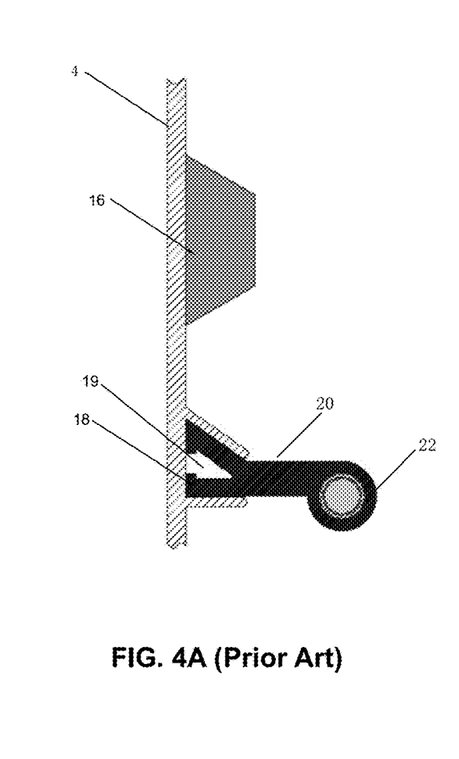
FIG. 4A is a partial cross-section view of a CRUX annular seal without a driven pile.
Figure 4B:
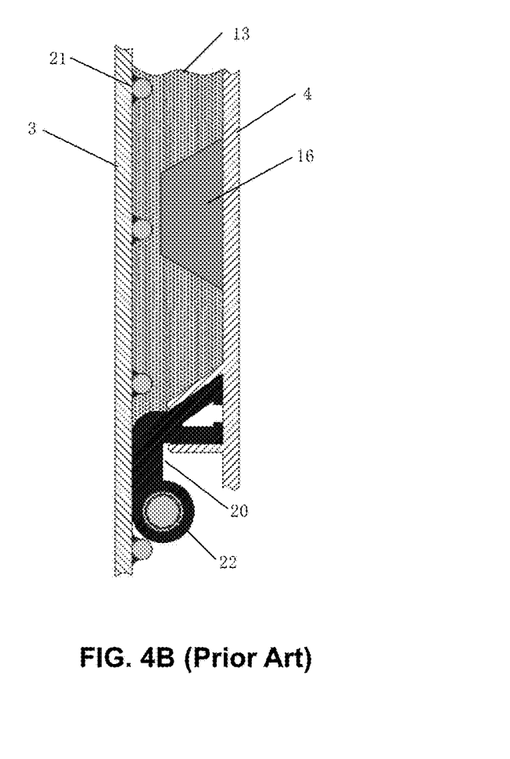
FIG. 4B is a partial cross-section view of a CRUX annular seal with a driven pile and a column of grout poured between the pile and the pile sleeve.

A typical passive seal is CRUX annular grout seal, which has an outer head portion attached at a sleeve inner surface and a bulbous ring functioning as the sealing element. FIG. 4A illustrates a CRUX annular seal element 20 prior to piling activities. As shown, a plurality of pre-installed tapered guide shim plates 16 are attached to the inner surface of a sleeve 4 above the CRUX grout seal. An outer head portion 18 is fixed to the sleeve 4 inner surface with an inside cavity 19. A bulbous ring 22 with a fiber core forms a sealing element during grouting. The inner diameter of the bulbous ring 22 is less than the outer diameter of a pile so that the deformed bulbous ring 22 produces compression force against the pile 3 outer surface to perform a grout sealing function and also functions as a mud wiper during pile inserting, lowering and driving. FIG. 4B is a partial cross-section view of a CRUX annular seal when a pile 3 is driven through and a column of grout 13 is poured through the annulus between a pile 3 outer surface and a pile sleeve 4 inner surface. As shown in FIG. 4B, the bulbous ring 22 is deformed and the annular seal element 20 is bended against the pile 3 outer surface in a vertical orientation, which has several levels of shear keys 21, to perform the grout sealing action against the poured column of grout 13.

A passive seal is significantly less expensive than an inflatable packer. However, the common concerns for passive seals are the protection and the reliability of the seals first section during the offshore installation in terms of pile inserting, lowering and pile driving. The pile 3 bottom outer sharp edge could work as a knife to damage the resilient rubber section between the bulbous ring 22 and the outer head portion 18 due to dynamic heave motions of a pile 3 during its lowering and inserting.

Figure 5:
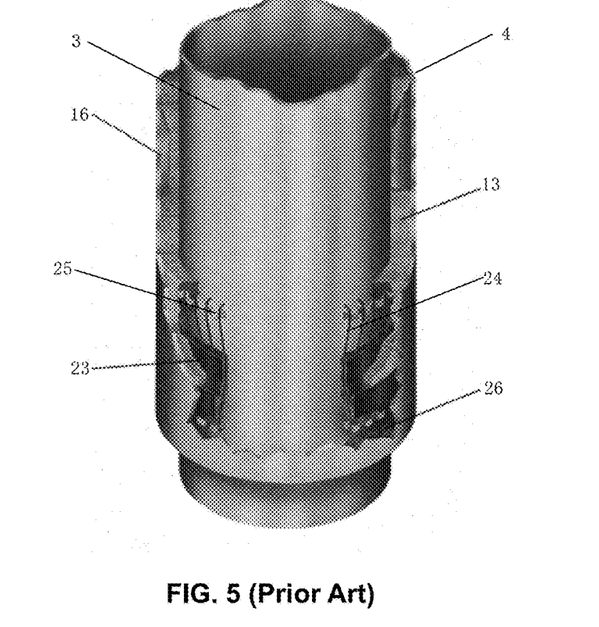
FIG. 5 is an ISO cut-off section view of a typical mechanical seal with a driven pile and a column of grout poured in the annulus between a pile and a pile sleeve.

It should also be pointed out that a traditional mechanical grout seal is another type of passive seal. Traditional mechanical grout seals are usually used only for shallow water applications because it could not take potential dynamic loading from shear keys which are commonly welded both on the pile top outer surface and on the sleeve inner surface of a deepwater jacket for increasing the concrete bonding strength between a sleeve and a pile. FIG. 5 illustrates an ISO cut-off section view of a typical mechanical seal with a driven pile and a column of grout poured in the annulus between a pile 3 outer surface and a pile sleeve 4 inner surface. As shown in FIG. 5, an elastic seal element 23 is an annular rubber tubular with an inner diameter less than the outer diameter of the pile 3. A plurality of curved steel strips 24, running through and bonded with the elastic seal element 23, slide upward through the fixed rings 25 when compressed. The steel strips 24 fixed at the bottoms 26 are also attached at the sleeve 4 inner surface. The elastic seal element 23 produces a grout sealing force, through the rubber restoring force due to the compressed elastic seal element 23 and the compressed steel strips 24 during pile inserting, against the poured column of grout 13 between the pile 3 outer surface and the inner surface of the sleeve 4. A plurality of pre-installed tapered guide shim plates 16 are above the seal element 23. Moreover, the seal element 23 also prevents the mud pollution from entering the sealed chamber during pile 3 driving.

Based on the discussion above, every type of grout seal requires one type of external force to perform its sealing action during a grouting operation. So far, only two types of external forces have been utilized for all existing grout seals in the offshore industry: 1) external high-pressure air as in the case of active grout seals; and 2) restoring force induced by deformed rubber elements during pile inserting and lowering. However, each of such types of the external force has its pros and cons in their field applications. The selection of which type external force as its sealing action force for each type grout seals is a critical factor to determine the grout seal overall reliability and the grout seal overall costs. Based on records of offshore jacket installations, inflatable packer type grout seals have the highest level of overall reliability compared with passive grout seals. However, they are also much more expensive than passive grout seals.

In August. 2014, the inventor of this disclosure first disclosed a third type of external force for grout sealing action in a new type of passive grout seal in U.S. Pat. No. 9,677,241 to Lee, issued on Jun. 13, 2107. In that patent, an annular elastomeric bag was utilized to perform a grout sealing function between a pile sleeve inner surface and a pile outer surface with the help of this third type of external force derived from the poured grout gravity force. In an underwater condition, the density difference between typical grout with density around 1.92 $g/cm^3$ and sea water with a density around 1.05 $g/cm^3$ shall be able to perform, with the help of a high pressure force inside the annular elastomeric bag during grouting operation, two grout sealing functions: 1) the vertical high pressure force acting at the elastomeric bag bottom over an annular gap performs the grout sealing action over the annular gap, and 2) the horizontal high pressure force, with the same magnitude as the vertical high pressure force because both grout and seawater are fluid, acting at the annular elastomeric bag inner surface against the pile outer surface to achieve the sealing effect between the pile outer surface and the sleeve inner surface.

In May 2017, two improvements were disclosed in U.S. Pat. No. 9,970,171 to Lee, issued on May 15, 2018, as the continuation-in-part of the above-mentioned patent. The first improvement was to add one planar ring plate or one cone shape ring plate to a sleeve inner surface below an annular resilient elastomeric bag. The purpose of adding the planar ring plate is to reduce the annular gap width and to let the planar ring plate take a large portion of the poured grout induced gravity loading away from the annular resilient elastomeric bag bottom. The purpose of adding a cone shape ring plate is similar to adding one planar ring plate, and, moreover, the cone shape ring plate can be combined with the bottom rubber band section to perform a plugging action to further enhance the sealing effect, because the added plate can take up the majority of grout induced loading. Moreover, this new addition makes it possible to greatly reduce the rubber band thickness of the annular elastomeric bag as well as the weight of the elastomeric bag. Such weight reduction not only reduce the fabrication cost of the grout seal, but also facilitate the transportation and site installation of the grout seal.

The second improvement was localized reinforcement of the annular elastomeric bag over the annular gap. Due to the weight reduction of the annular resilient elastomeric bag, most of the elastomeric bag rubber band thicknesses becomes very thin, and so the band section of the thin layer over the annular gap could be bulged out with a local stress concentration. This additional localized reinforcement is achieved by adding one annular bandage layer at the bottom inner surface of the elastomeric annular bag over the location of the annular gap. Because it is localized reinforcement, the increased weight of the elastomeric bag is limited. In addition, the localized reinforcement annular band section can be combined with the cone shape plate to perform a plugging action for grout sealing. This plug assisted grout sealing is a different grout sealing action for the annular gap compared with the conventional bulging based sealing action for the annular gap. In other words, the grout seal configuration based on the above two improvements can bring up two independent grout sealing actions to further enhance the overall system reliability.

The selected third external force for grout sealing in the above mentioned patents has three key advantages over the two existing external forces for grout sealing, as follows:

1) The gravity based external pressure force, namely, gravity differential pressure force, comes from a very reliable source without a need for any external power input as in the case of inflatable packers. Such force eliminates all potential sources for harmful results known to the offshore industry, not only for active grout seals but also for passive grout seals. Therefore, such gravity differential pressure force based grout seal shall have significantly higher system reliability than any existing grout seal;

2) The magnitude of the gravity differential pressure force depends solely on two factors: grout density and grout column height. Unlike the external force utilized by an inflatable packer, the gravity based external force is independent of water depth. Based on one conventional deepwater jacket sleeve-to-pile configuration, the magnitude of the gravity differential pressure force shall be sufficient to perform the two grout sealing functions mentioned earlier, as illustrated in the following example: one 84" O.D. pile inside one 90" I.D. sleeve with one foot (about 300 mm) tall band section for one annular resilient elastomeric bag, a grout column height of 30 feet (about 9.1 m, typical designed grout column heights ranging between 25~40 feet) and a maximum gap width of 3" (about 76 mm). In this configuration, the total vertical pressure force reaches around 4 S. Tons (about 3.6 M. Tons) at the elastomeric bag bottom over the annular gap width and the total horizontal pressure force, acting at the resilient elastomeric bag inner surface against a pile outer surface, reaches over 18 S. Tons (about 16 MT). Test results confirmed that the minimum required grout column height for a grout sealing action is about 3 feet (about 1 meter);

3) The cost to obtain the gravity based external force for grout sealing is almost zero, in contrast with the very high cost for inflatable packers, as well as with the other two types of passive grout seals, which require extra fiber reinforcement at a considerable cost.

Based on the discussions above, all the different types of subsea grout seals, including the ones for offshore jacket installations and the ones for offshore wind turbine structure installations, face the same challenges as how to achieve and maintain system overall reliability, what kind external force to be used for a grout sealing action, how to handle different sizes of the annular gaps, how to make it easy for transportation & installation of grout seals, and how to reduce system overall costs. In this disclosure, a simple, reliable and inexpensive subsea grout seal system is disclosed for all types of offshore structure installations, including both jacket installations and wind turbine structure installations, and particularly this new type of grout seal is able to overcome a wide range of annular gap sizes.

OBJECTIVES AND SUMMARY OF THE INVENTION

The principal objective of the disclosure is to provide a general purpose passive subsea grout seal assembly, which is suitable for either offshore jacket installations or offshore wind turbine structure installations, being capable of overcoming a wide range of annular gap sizes, and equipped with a reliable configuration design by eliminating all known potential harmful factors currently inherent in all different types of existing grout seals.

Another important objective of the disclosure is to provide the above-mentioned general purpose grout seal assembly at a significant lower cost one, even compared with existing passive grout seals. In addition, the assembly fabrication cost of such new grout seal will be insensitive to any increase of annular gap sizes.

A still further important objective of the disclosure is that the above-mentioned general purpose grout seal assembly is simple in design, as well as lighter in weight and easier for transportation and installation. Key structure can be fabricated in identical substructures and can be easily assembled at an installation site.

Another objective of the disclosure is that the new subsea grout seal can work effectively and independently of water depth.

Such as a general purpose passive subsea grout sealing device suitable for different offshore subsea grout sealing applications and capable of overcoming a wide range of annular gap sizes, the assembly comprises a gap self-reducing device to reduce existing annular gaps during grouting operation. Such assembly is a passive system both for gap self-reduction and for sealing the remaining gaps after the gap size reduction.

This disclosed general purpose subsea grout seal assembly has clear advantages over all existing types of grout seal assemblies in terms of higher system reliability without any known harmful factors based on historical offshore jacket installation experiences, lower fabrication cost especially in dealing with large annular gaps, and lighter \weight for easier transportation and installation.

BRIEF DESCRIPTION OF THE DRAWINGS

The drawings described herein are for illustrating purposes only of selected embodiments and not all possible implementations, and are not intended to limit the scope of the present disclosure. For further understanding of the nature and objects of this disclosure reference should be made to the following description, taken in conjunction with the accompanying drawings in which like parts are given like reference materials, and wherein:

FIG. 6D-1 is a front view of the FIG. 6D when two flip plates are in a vertical orientation with a maximum lateral gap size between the two flip plates and without connection details in accordance with one embodiment;

FIG. 6D-2 is a front view of a flexible waterproof connection between two flip plates shown in FIG. 6D as two flip plates in a vertical orientation at a maximum lateral gap and with the connection details in accordance with one embodiment;

DETAILED DESCRIPTION OF THE EMBODIMENTS

Before explaining the disclosed apparatus in detail, it is to be understood that the system and method is not limited to the particular embodiments and that it can be practiced or carried out in various ways.

In accordance with one embodiment of the present disclosure, figures from FIG. 6A through FIG. 6E illustrate the key configurations of the disclosed annular grout seal, designed for a deepwater jacket installation facing a traditional annular gap size such as about 2½" (about 64 mm), composed of three main substructures: an elastomeric annular bag 100 with sealed sides and bottom, installed at the sleeve 4 inner surface and below pre-installed tapered guide shim plates 16; a gap self-reducing device fixed at the upper surface of a planar annular plate 118, which is fixed to sleeve inner surface and below the elastomeric annular bag 100; and a grouting piping system 113, installed at the sleeve 4 outer surface enabling grout 13 pouring directly into the annular bag 100.

Figure 6A:
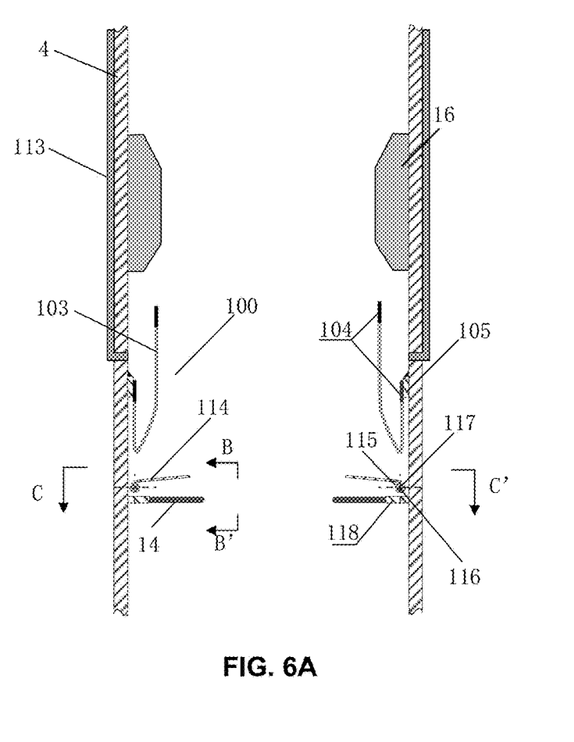
FIG. 6A is the A-A' cross-section view of a grout seal disclosed herein shown in FIG. 6C for an offshore jacket installation facing a conventional annular gap size with an elastomeric annular bag, above a gap self-reducing device and below a plurality of pre-installed shim plates in accordance with one embodiment.
Figure 6B:
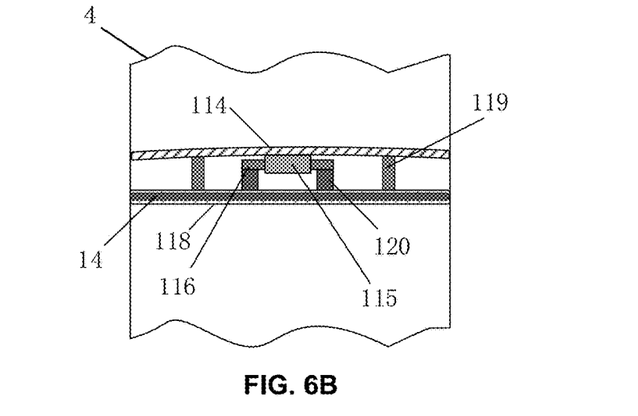
FIG. 6B is an enlarged B-B' front view of the gap self-reducing device shown in FIG. 6A with details of a hinged connection between a flip plate, in a horizontal orientation, and a hinged device and with a planar ring plate fixed at a sleeve inner surface to provide a support for the gap self-reducing device in accordance with one embodiment.
Figure 6C:
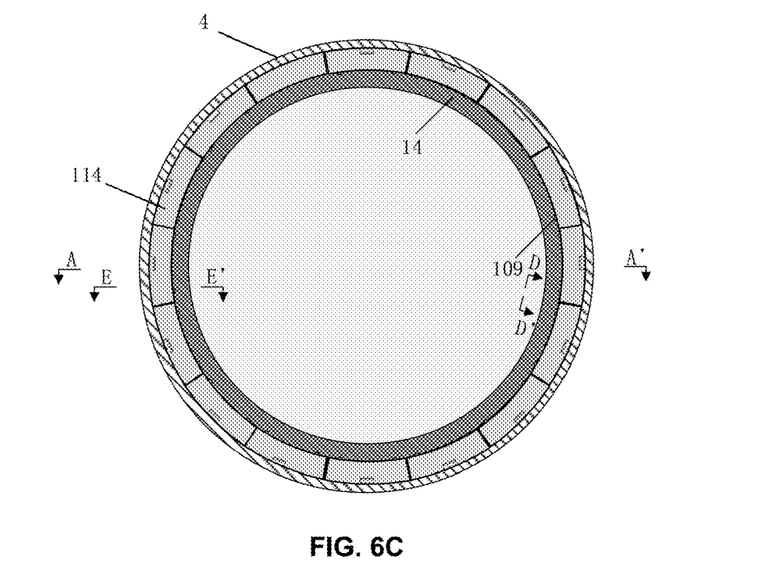
FIG. 6C is a cross-section C-C' top view of the gap self-reducing device shown in FIG. 6A with a plurality of individual gap self-reducing substructures circularly arranged against the sleeve inner surface in accordance with one embodiment.

Referring to FIG. 6A which is the A-A' cross-section view shown in FIG. 6C, the elastomeric annular bag 100 is a top open and side & bottom sealed bag for housing grout 13. The elastomeric annular bag 100 inner top band section 104 and bottom band section 104' are composed of fiber reinforced rubber and the middle section 103 is composited with pure rubber band section. An annular doubler 105 outer surface is fixed to the sleeve 4 inner surface and the annular doubler 105 inner surface is bonded with the elastomeric annular bag 100 bottom band section 104' to form a top open and side & bottom sealed annular bag 100.

The gap self-reducing device is anchored at the upper surface of a planar annular plate 118, of which the outer annular surface is fixed to the sleeve 4 inner surface. Each identical substructure of the device is composed of two key components: a flip plate 114 and a hinged device. The flip plate 114 bottom down surface is connected to the hinged device. A mud wiper 14 is fixed to the inner surface of the annular planar plate 118.

Referring to FIG. 6B shown in the B-B' cross-section view in FIG. 6A, it illustrates the enlarged view of the hinged connection details: a curved flip plate 114 in a horizontal orientation with supports 119; and a pipe 115 housing a pair of bearings 117 is supported by load bearing bar 116 which is supported by foundations 120.

FIG. 6C is the C-C' cross-section top view in FIG. 6A. From the top view, 16 gap reducing substructures circularly arranged against the sleeve 4 inner surface in accordance with one embodiment. All flip plates 114 are in a horizontal orientation with a minimum lateral gap between any two flip plates 114 and with two half rings 109 at each flip plate 114 front. The mud wiper 14 has a central opening with its diameter smaller than an inserting pile O.D.

Figure 6D:
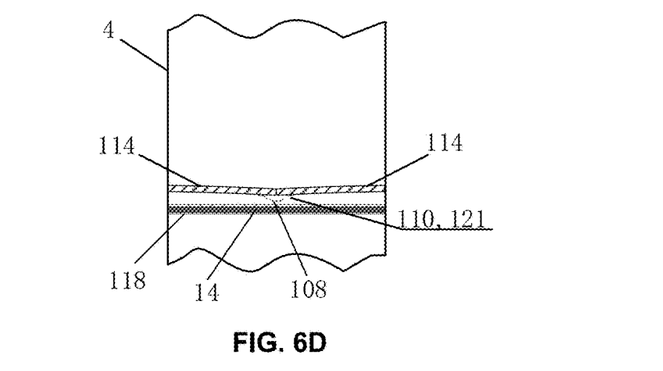
FIG. 6D is an enlarged D-D' front view of a flexible connection between two flip plates shown in FIG. 6C as flip plates in a horizontal orientation with a minimum lateral gap between the two flip plates in accordance with one embodiment.
Figure 6D:
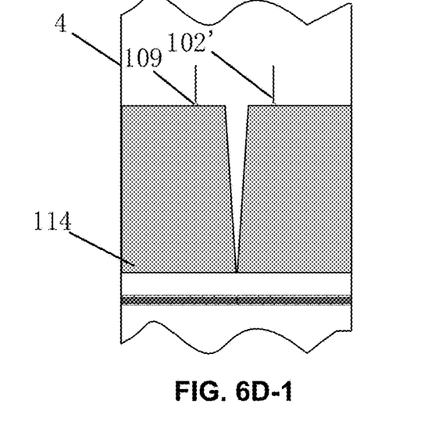
Figure 6D:
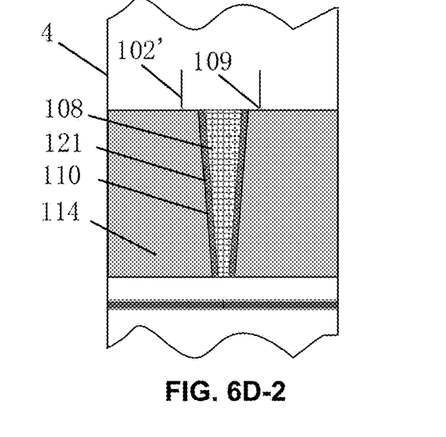

FIG. 6D illustrates the enlarged D-D' partial front view of a flexible connection between two flip plates 114 shown in FIG. 6C as flip plates in a horizontal orientation, in accordance with one embodiment. A piece of waterproof connecting fabric 108 is utilized to seal the lateral gap size with the help of two waterproof pressing belts 110 and a plurality of screw bolts 121. The gap size becomes the smallest when all flip plates 114 are in a horizontal orientation and, conversely, the gap size becomes the largest as shown in FIG. 6D-1, when all flip plates 114 are in a vertical orientation. FIG. 6D-2 illustrates the connection details for the maximum gap shown in FIG. 6D-1 with one piece of waterproof connecting fabric 108, a pair of waterproof pressing belts 110 and a plurality of screw bolts 121. Tensioned lower elastic wire 102' between the half ring 109 and the corresponding lower rubber belt ring 106' provides an uplifting force at the flip plate 114 top to keep it in a near vertical orientation during an offshore installation.

Figure 6E:
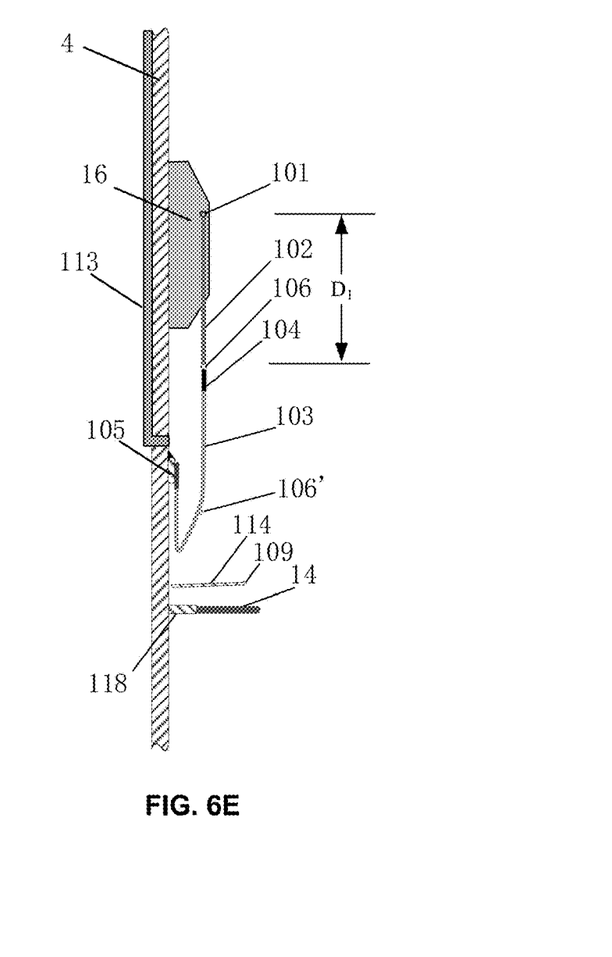
FIG. 6E is an enlarged E-E' cross-section view of a partial subsea grout seal disclosed herein shown in FIG. 6C with a flip plate in a horizontal orientation in accordance with one embodiment.

FIG. 6E illustrates the enlarged E-E' cross-section view of a partial subsea grout seal disclosed herein shown in FIG. 6C with a flip plate 114 in a horizontal orientation in accordance with one embodiment. Each tensioned upper elastic wire 102 is utilized between one hook 101 fixed at one shim plate 16 side near inner surface and one upper rubber belt ring 106, which is bonded at the elastomeric annular bag 100 top rubber band section with fiber reinforcement 104. The distance $D_1$ between the hook 101 and the upper rubber belt ring 106 shall be equal or larger than one foot (about 300 mm) in order to keep a very small angle in case the upper belt ring 106 is moved toward the pile 3 outer surface. The longer the distance $D_1$, the smaller the maximum angle, which produces a horizontal component force to pull the top rubber band section 104 away from the pile 3 outer surface during grouting operation.

It serves two purposes to place a fiber reinforced rubber band section 104 at the elastomeric annular bag 100 top: 1) to ensure the annular bag 100 top in a circular shape, and 2) to have a smooth load transition from the rubber band section 104 top as a point load to the rubber band section 104 bottom as an area to area load.

In accordance with one embodiment of the present disclosure, figures from FIG. 6F through FIG. 6I illustrate the key configurations of the disclosed annular grout seal during a normal offshore grouting operation of a conventional deepwater jacket 2 installation facing a conventional gap size with a driven pile 3 with and without a pile offset.

Figure 6F:
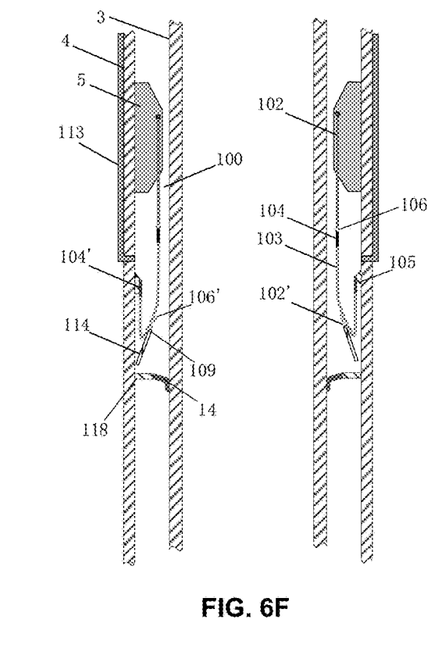
FIG. 6F is a cross-section view of the subsea grout seal disclosed herein shown in FIG. 6E with all flip plates in a near vertical orientation ready for an offshore jacket installation and with an offset free driven pile within the pile sleeve in accordance with one embodiment.

FIG. 6F illustrates the similar cross-section view of a full subsea grout seal disclosed herein shown in FIG. 6E with all flip plates 114 in a near vertical orientation and with each tensioned lower elastic wire 102' making a connection between the lower rubber belt ring 106' and a half ring 109 at each flip plate top. A driven pile 3 without offset is placed in the middle of the sleeve 4.

In this configuration, the disclosed subsea annular grout seal is ready for offshore installation with its radical width less than the radical width of the pre-installed tapered guide shim plates 16 above. Therefore, the subsea annular grout seal is fully protected by these shim plates 16 during pile 3 inserting, lowering and driving. The fiber orientation inside the fiber reinforced rubber band sections 104 and 104' is very important for this disclosed subsea annular grout seal, as it is required to have all fibers inside a rubber band section 104 or 104' to be in a vertical and continuous orientation so that the elastomeric annular bag 100 has a very low stiffness in radical and circular directions, similar to a pure rubber band section 103. However, its vertical stiffness is very high which can be utilized for sealing a normal size annular gap.

Figure 6G:
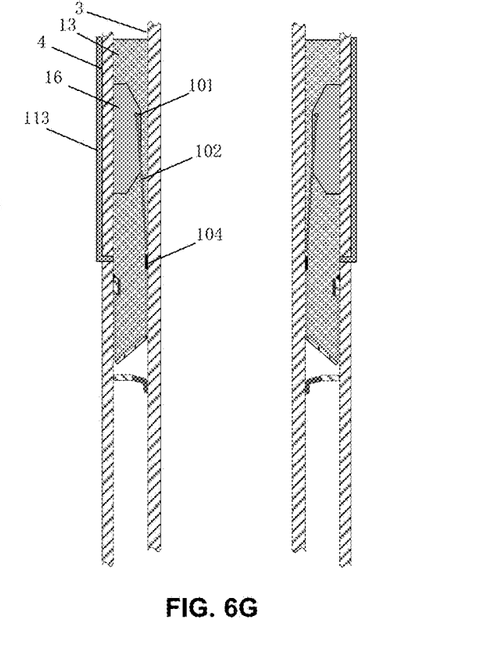
FIG. 6G is a cross-section view of the subsea grout seal disclosed herein shown in FIG. 6F in a post grouting operation configuration in accordance with one embodiment.

FIG. 6G illustrates a post grouting operation configuration of FIG. 6F. As grout is poured inside the elastomeric annular bag 100 through a grouting piping system 113, the gravity differential pressure force acting at the annular bag 100 bottom pushes down the bag bottom and forces all flip plates 114 to tilt from a near vertical orientation toward the outer surface of the pile 3. The stiffness of the pure rubber band sections 103 is very low and very easy to be expanded downward. Once the bottom of the annular bag 100 bottom is in full contact with the flip plates 114 upper surface, it will pass all its loading pressure to these flip plates 114 upper surface, with these flip plates 114 then becoming supporting structures within the annulus, and with the gap size reduced greatly such as from 2½" to ½" or less. With such gap reduction, the soft rubber band section 103 becomes an excellent choice to seal these remaining small gaps. Horizontally, the annular bag 100 inner surface will expand and press against the pile 3 outer surface easily, due to the low stiffness of the annular bag 100 in radical and circular directions. As the grout 13 column height increases, the lateral pressure force between the annular bag 100 inner surface and the pile outer surface will increase accordingly to prevent any potential grout leaking between the pile 3 outer surface and the sleeve 4 inner surface.

Figure 6H:
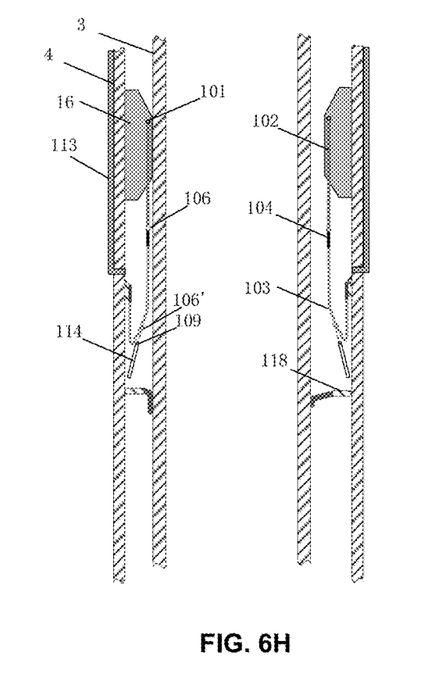
FIG. 6H is a cross-section view of a subsea grout seal disclosed herein shown in FIG. 6F with flip plates in a near vertical orientation ready for an offshore jacket installation and with a driven pile within the sleeve at a maximum pile offset in accordance with one embodiment.
Figure 6I:
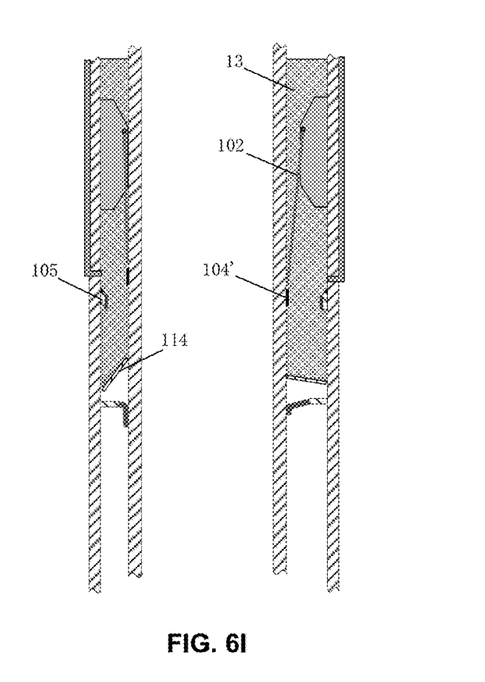
FIG. 6I is a cross-section view of the subsea grout seal disclosed herein shown in FIG. 6H in a post grouting operation configuration in accordance with one embodiment.

FIG. 6H and FIG. 6I illustrate the similar configurations shown in FIG. 6F and FIG. 6G except for the driven pile 3 with a maximum pile offset.

Figure 6J:
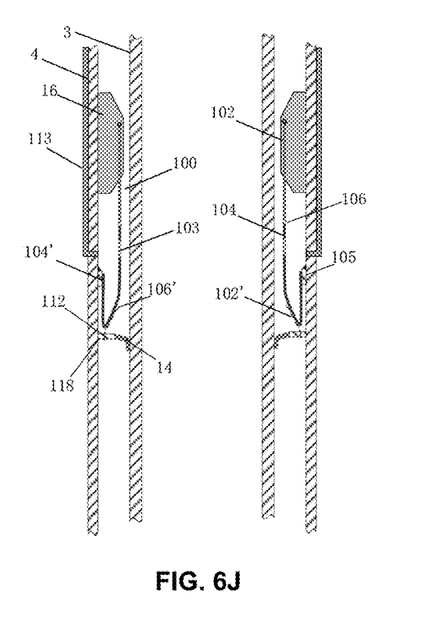
FIG. 6J is a cross-section view of a subsea grout seal disclosed herein shown in FIG. 6F without the gap self-reducing device in accordance with one embodiment.
Figure 6K:
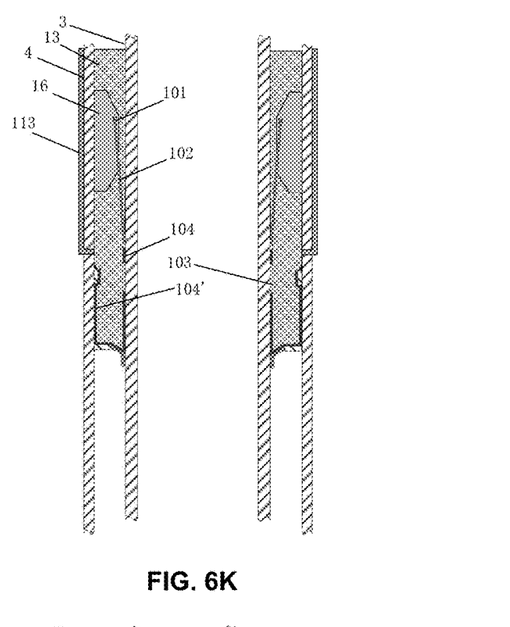
FIG. 6K is a cross-section view of the subsea grout seal disclosed herein shown in FIG. 6J in a post grouting operation configuration in accordance with one embodiment.

In accordance with one embodiment of the present disclosure, FIG. 6J and FIG. 6K illustrate key configurations of the disclosed annular grout seal similar to the configurations in 6F and 6G, except for complete deletion of the gap self-reducing device. The main purpose of doing so is to further simplify the overall structure and to further reduce the overall system costs in case that the gap sizes are under 3" (about 76 mm or less).

FIG. 6J is similar to FIG. 6F except for the following changes: 1) the gap self-reducing device is deleted, 2) holes 112 for lower elastic wire connections 102' are driven at the planar annular plate 118 and let the tensioned lower elastic wire 102' top connect the lower rubber belt ring 106', bonded at the elastomeric annular bag bottom outer surface, to get through the drilled hole 112 and to be fixed at the drilled hole 112 bottom, 3) the rubber band sections 104 are all made of fiber reinforced rubber, with all the fibers within oriented vertically and continuously as described earlier, in order to increase the vertical stiffness over the annular gap during grouting operation, and 4) as one option depending on grout column height, an elastic pure rubber band section 103 is placed below a top fiber reinforced rubber band section 104 to facilitate an effective grout sealing action with the pure rubber band section 103 between the annular bag 100 inner surface and the pile 3 outer surface. The choice to insert one pure rubber band section is dependent on the grout column height. If the column height is high, the loading at the annular gap and inside the rubber band section becomes high, then the pure rubber band section 103 shall be replaced by one fiber reinforced rubber band section 104. If the column height is lower, the sealing between the annular bag inner surface and the pile 3 outer surface becomes the main concern, a pure rubber band section 103 shall be installed below the top fiber reinforced rubber band section 104.

FIG. 6K is the post grouting operation configuration of the FIG. 6J. As grout is poured into the elastomeric annular bag 100 through the grouting piping system 113, the pressure force acting at the annular bag 100 bottom will push down the bottom, with the help of the downward elongations of the upper tensioned elastic wires 102 and the elastic pure rubber band section 103, if installed, until it touches and covers the annular gap below. And then the vertical and continuous fiber reinforced rubber lower band section 104' will provide the stiffness over the annular gap. In addition, horizontally a pulling force is utilized from the sleeve inner surface side to reduce the bulge over the annular gap; and vertically, an uplifting force will also be utilized against the pile 3 outer surface to reduce the size of the bulge. The uplifting force will depend on the following factors: the stiffness and the load bearing capacity of these upper tensioned elastic wires 102, the rubber band section 104 stiffness and the friction force between the rubber band section inner surface and the pile 3 outer steel surface, which has an underwater friction coefficient typically in the range of 0.2~0.3.

In accordance with one embodiment of the present disclosure, figures from FIG. 7A through FIG. 7D illustrate the key configurations of the disclosed annular grout seal during a normal offshore grouting operation of a wind turbine structure installation facing a very large annular gap size (about 8 inches or about 200 mm) with a supporting leg 123 inside a driven sleeve 4, with and without leg 123 offset.

Figure 7A:
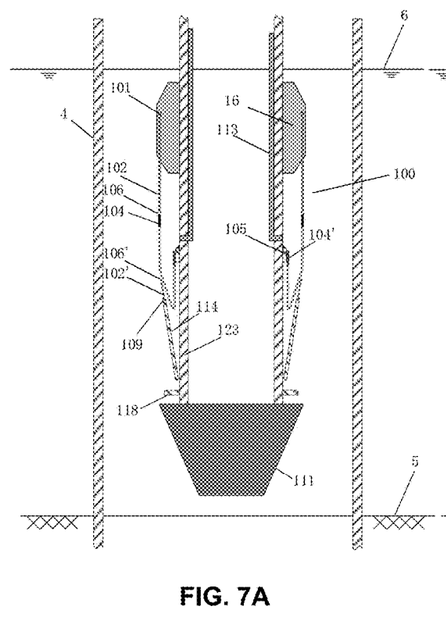
FIG. 7A is a cross-section view of the grout seal disclosed herein for offshore wind turbine structure installation facing a large annular gap size and with an annular grout seal installed at the bottom of an inserted supporting leg outer surface inside a driven sleeve in an offset free configuration in accordance with one embodiment.

FIG. 7A is a cross-section view of the grout seal disclosed herein for offshore wind turbine structure installation with a disclosed annular grout seal installed at the bottom of the supporting leg 123 outer surface inside a driven sleeve 4 without leg 123 offset in accordance with one embodiment. Changes for the subsea grout seal in FIG. 7A, which cover changes from a jacket offshore installation shown in FIG. 6F to a wind turbine offshore installation facing a very large annular gap shown in FIG. 7A, comprise: 1) a cone shape stabbing guide 111 is placed at the bottom of the supporting leg 123, 2) mud wiper is deleted, 3) the flip plate 114 height is increased according to the annular corresponding gap width, and the flip plate height shall be larger than the annular gap width, 4) the grouting piping system is located at the inner surface of the supporting leg 123, 5) all flip plates lateral gaps are designed to be minimum when they are in a vertical orientation and to be a maximum when they are in a horizontal orientation; and 6) all waterproof connecting fabrics 108 shall be placed at flip plates 114 upper surfaces in order to avoid potential contact with a sleeve 4 top inner edge during the supporting leg 123 inserting, in accordance with one embodiment.

Figure 7B:
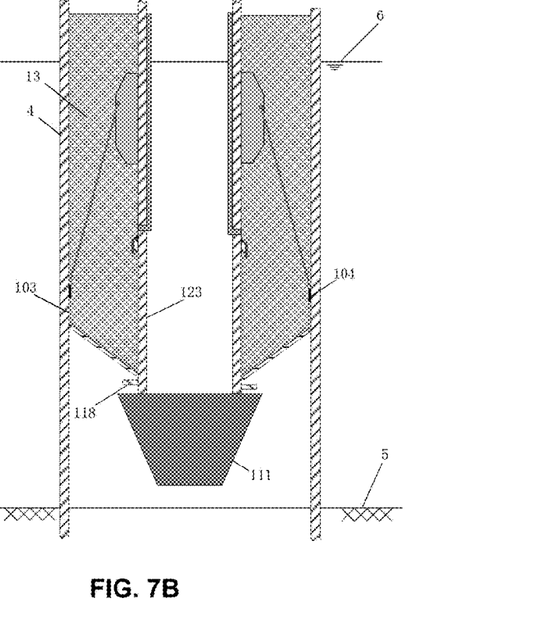
FIG. 7B is a cross-section view of the subsea grout seal disclosed herein shown in FIG. 7A in a post grouting operation configuration in accordance with one embodiment.

FIG. 7B illustrates the post grouting operation configuration of FIG. 7A. The basic mechanical actions during the grouting operation is similar to the mechanical actions described earlier in FIG. 6G.

Figure 7C:
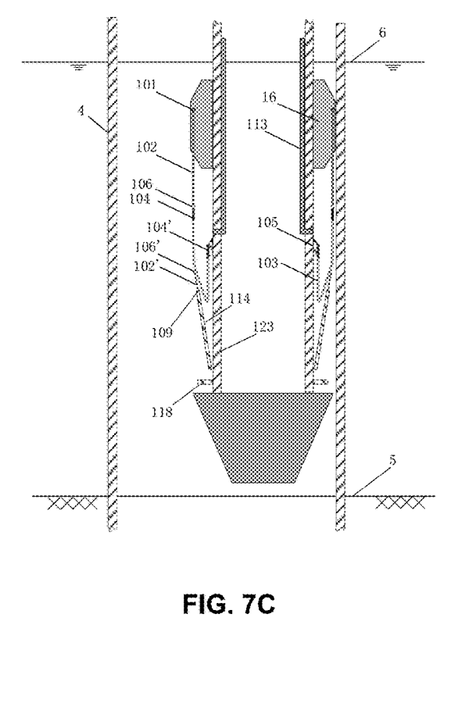
FIG. 7C is a cross-section view of the subsea grout seal disclosed herein shown in FIG. 7A with an inserted supporting leg in a maximum offset configuration in accordance with one embodiment.
Figure 7D:
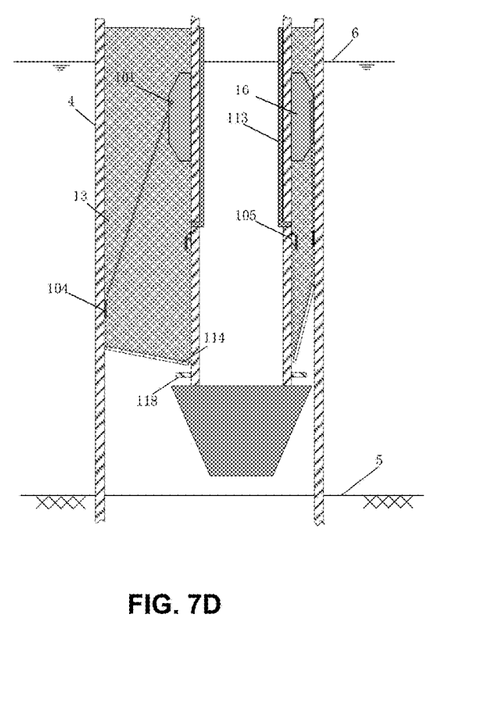
FIG. 7D is a cross-section view of the subsea grout seal disclosed herein shown in FIG. 7C in a post grouting operation configuration in accordance with one embodiment.

FIGS. 7C and 7D illustrate the similar configurations shown in FIG. 7A and FIG. 7B except for the inserting supporting leg 123 with a maximum leg 123 offset.

Figure 8A:
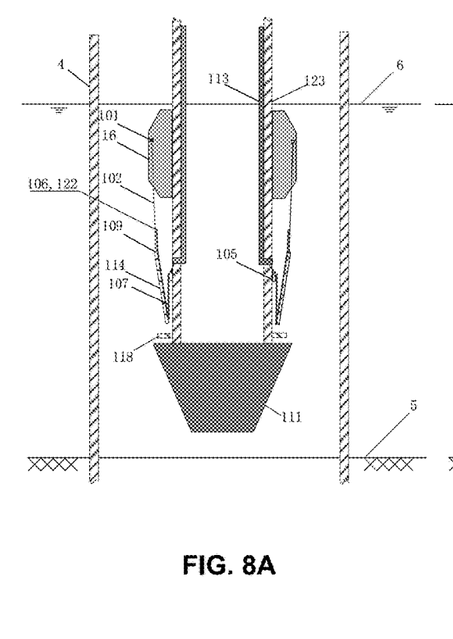
FIG. 8A is a cross-section view of a grout seal disclosed herein for offshore wind turbine structure installation, similar to the one shown in 7A except for the flexible elastomeric bag replaced by a flexible waterproof fabric bag in accordance with one embodiment.
Figure 8B:
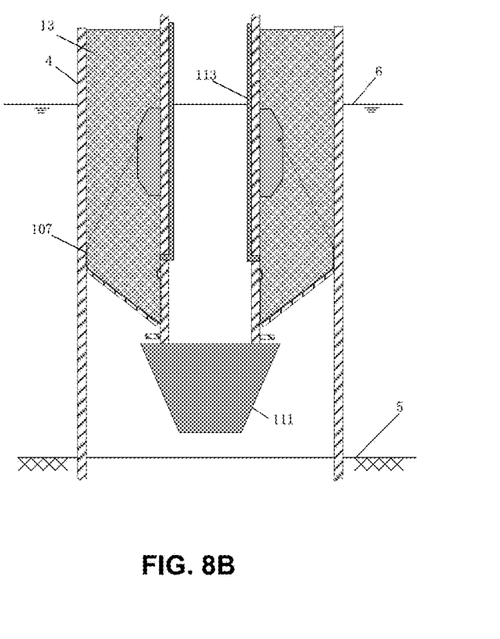
FIG. 8B is a cross-section view of the subsea grout seal disclosed herein shown in FIG. 8A in a post grouting operation configuration in accordance with one embodiment.

In accordance with one embodiment of the present disclosure, FIG. 8A and FIG. 8B illustrate the key configurations of the disclosed annular grout seal during a normal offshore grouting operation of a wind turbine structure deepwater facing a very large annular gap size (about 8 inches or about 200 mm) with a supporting leg 123 inside a driven sleeve 4, with and without leg offsets. However, the elastomeric annular bag 100 is replaced by a waterproof annular fabric bag 107 in order to reduce the grout seal system overall weight and costs.

FIG. 8A shows a similar configuration as shown in FIG. 7A except for the following changes: 1) each tensioned elastic wire 102 having a top connection to a hook 101 and having a bottom connection to a half ring 109 at the top of the flip plate 114, 2) a plurality of rubber belt rings 106, located at each tensioned elastic wire 102 above the half rings 109, utilized to tie-up with the rings 122 installed at the top of the waterproof annular fabric bag 107, and 3) an annular doubler 105 inner surface fixed to the supporting leg 123 outer surface and the annular doubler 105 outer surface having a waterproof connection with the waterproof annular fabric bag 107 bottom surface.

FIG. 8B illustrates the post grouting operation configuration of FIG. 8A. The basic mechanical actions during the grouting operation is similar to the mechanical actions described earlier in FIG. 6G.

Figure 8C:
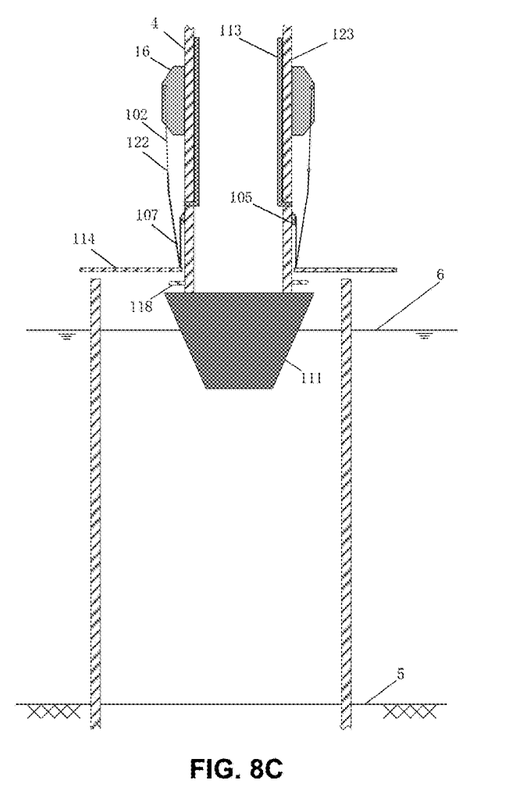
FIG. 8C is a cross-section view of the subsea grout seal disclosed herein shown in FIG. 8A except that all flip plates are in a horizontal orientation above a driven sleeve top during a wind turbine structure offshore installation in accordance with one embodiment.
Figure 8D:
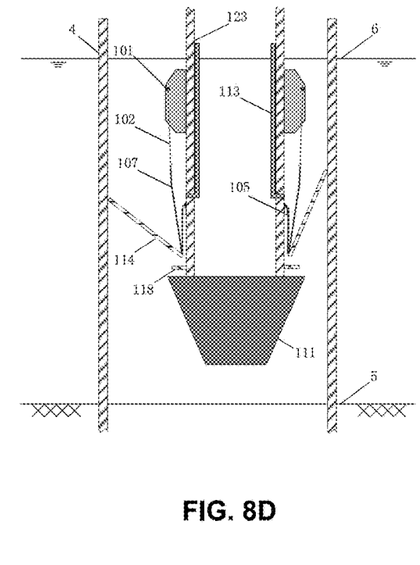
FIG. 8D is a cross-section view of a subsea grout seal disclosed herein, similar to FIG. 8C with all flip plates tilting downward inside the sleeve to a final position with a limited leg offset in accordance with one embodiment.
Figure 8E:
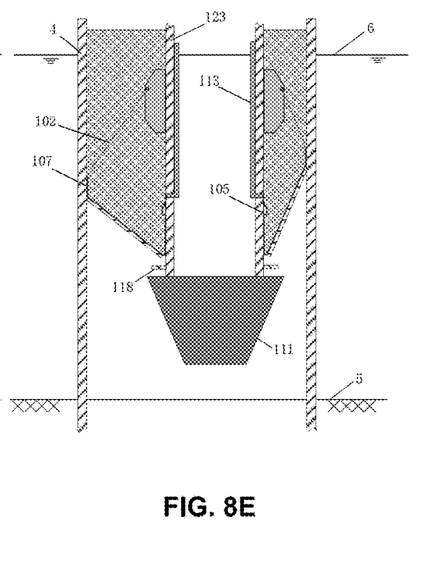
FIG. 8E is a cross-section view of a subsea grout seal disclosed herein shown in FIG. 8D in a post grouting operation configuration in accordance with one embodiment.

In accordance with one embodiment of the present disclosure, figures from FIG. 8C through FIG. 8E illustrate the key configurations of the disclosed annular grout seal during a normal offshore grouting operation of a wind turbine structure facing a very large annular gap size (about 8 inches or about 200 mm) with a supporting leg 123 inside a driven sleeve 4, with a limited leg 123 offset.

FIG. 8C shows an identical configuration as shown in FIG. 8A except for the following changes: 1) all flip plates 114 in a horizontal orientation with the help of these supports 119, similar ones shown in FIG. 6B, before the supporting leg 123 inserting into the sleeve 4, 2) the supporting leg 123 with a limited offset during the inserting, and 3) the rubber belt rings 106 eliminated and rings 122 directly connecting to these hooks 101 above by these tensioned elastic wires 102.

The advantages of such configuration include 1) supporting leg 123 offsets can be observed clearly before leg 123 inserting in order to provide a centralized coordination for different offsets induced by different supporting legs 123, and 2) eliminating the risk of the flip plates unable to open and tilt from a vertical to a horizontal orientation. As stated earlier, offshore wind turbine structure installations usually occur in a shallow water area with small waves during installations. Therefore, this recommended grout seal configuration is workable for such small wave conditions.

FIG. 8D illustrates the final lowering configuration of the supporting leg 123 inside the sleeve 4. During the lowering, all flip plates 114 tilt downward against the inner surface of the sleeve 4 until a final configuration is reached.

FIG. 8E illustrates the post grouting operation configuration of FIG. 8D. The basic mechanical actions during the grouting operation is similar to the mechanical actions described earlier in FIG. 6G.

Although a preferred embodiment of a grout seal assembly in accordance with the present invention has been described herein, those skilled in the art will recognize that various substitutions and modifications may be made to the specific features herein described without departing from the scope and spirit of the invention as recited in the appended claims.

What is claimed is:

1. A passive grout seal assembly, installed at an annular structure surface below a plurality of tapered shim plates pre-installed on the annular structure surface and near the bottom of an annulus between a sleeve structure and a tubular structure inserting from above, with the assembly radical width less than the radical width of the tapered shim plates, for sealing an annular gap within the annulus during an offshore structure installation, the grout seal assembly comprising:

- a flexible annular bag with sealed sides and bottom installed at the annular structure surface, the annular bag having a plurality of flexible fixings at circular top connected to a plurality of fixings at side surfaces of the tapered shim plates above by a first plurality of flexible connectors, the annular bag bottom being connected to a sealed fixing at the annular structure surface;
- a gap self-reducing system installed at the annular structure surface below the annular bag, wherein the gap self-reducing system comprises a plurality of gap reducing substructures circularly arranged, each substructure equipped with at least two components: a flip plate, kept in a near vertical orientation prior to the offshore installation by a second plurality of flexible connectors, and a hinged device, and a plurality of waterproof connecting fabrics placed at the flip plate upper surfaces and between each pair of flip plate lateral sides are utilized for sealing lateral gaps during flip plate tilting actions;
- a planar ring plate fixed at the annular structure surface below the gap self-reducing system; and
- a grout piping system for pouring grout directly into the flexible annular bag during grouting operation.

2. The passive grout seal assembly according to claim 1, wherein the annular bag comprises at least two different band sections: a pure rubber band section and a fiber reinforced band section.

3. The passive grout seal assembly according to claim 2, wherein the annular bag comprises two fiber reinforced band sections located at the annular bag top and annular bag bottom respectively, and one pure rubber band section between the two fiber reinforced band sections.

4. The passive grout seal assembly according to claim 3, wherein the two fiber reinforced band sections comprise all vertically and continuously oriented fibers.

5. The passive grout seal assembly according to claim 1, wherein the flexible fixings at the annular bag circular top are a plurality of rubber belt rings, the plurality of fixings at side surfaces of the tapered shim plates are a plurality of hooks, the first plurality of flexible connectors are a plurality of tensioned elastic wires in a vertical orientation, with a minimum vertical height of at least one foot, connecting the plurality of hooks and corresponding rubber belt rings.

6. The passive grout seal assembly according to claim 1, wherein the sealed fixing is an annular doubler.

7. The passive grout seal assembly according to claim 1 further comprising a pair of fixings at each flip plate top and a plurality of soft fixings at the annular bag outer surface near the bag bottom, wherein the second plurality of flexible connectors are a plurality of tensioned elastic wires connecting the fixings at the flip plate top and the soft fixings near the annular bag bottom, keeping all flip plates near a vertical orientation during the offshore installation.

8. The passive grout seal assembly according to claim 7, wherein each flip plate has a height larger than a designed annular gap width, the pair of fixings at each flip plate top are two half rings, the soft fixings near the annular bag bottom are rubber belt rings, and the flip plate bottom down surface is connected with the hinged device below.

9. The passive grout seal assembly according to claim 1, wherein the hinged device comprises a pipe for housing a pair of bearings, and a load support bar through a bearing inner hole being supported by a pair of foundations anchored at upper surface of the planar ring plate.

10. The passive grout seal assembly according to claim 1, wherein the waterproof connecting fabric comprises a piece of waterproof annular fabric, a pair of waterproof pressing belts and a plurality of screw bolts.

11. The passive grout seal assembly according to claim 1, wherein the offshore structure is a jacket structure, the sleeve structure is a pile sleeve, the a tubular structure inserting from above is a inserting pile, the annular structure surface is the pile sleeve inner surface, the grout piping system is installed at the pile sleeve outer surface.

12. The passive grout seal assembly according to claim 1, wherein the offshore structure is a wind turbine structure, the annular bag is a waterproof annular fabric bag, the sleeve structure is a driven sleeve, the tubular structure inserting from above is a supporting leg with a cone shape stabbing guide at the supporting leg bottom, the annular structure surface is the supporting leg outer surface, and the grout piping system is installed at the supporting leg inner surface.

13. A passive grout seal assembly, installed at an annular structure surface below a plurality of tapered shim plates pre-installed on the annular structure surface and near the bottom of an annulus between a sleeve structure and a tubular structure inserting from above, with the assembly radical width less than the radical width of the tapered shim plates, for sealing an annular gap within the annulus during an offshore structure installation, the grout seal assembly comprising:

- a flexible annular bag with sealed sides and bottom installed at the annular structure inner surface, the annular bag having a first plurality of flexible fixings at circular top connected to a plurality of fixings at side surfaces of the tapered shim plates above by a plurality of flexible connectors, and a second plurality of flexible fixings bonded at the annular bag bottom outer surface, the annular bag bottom being connected to a sealed fixing at the annular structure inner surface;
- a planar ring plate fixed at the annular structure inner surface below the flexible annular bag, the planar ring plate having a plurality of drilled holes pairing with the second plurality of flexible fixings at the annular bag bottom, the annular bag bottom is connected to the planar ring plate upper surface by connecting the plurality of drilled holes on the planar ring plate and the corresponding second plurality of flexible fixings through a plurality of tensioned elastic wires; and
- a grout piping system for pouring grout directly into the flexible annular bag during grouting operation.

14. The passive grout seal assembly according to claim 13, wherein the annular bag comprises at least two different band sections: a pure rubber band section and a fiber reinforced band section.

15. The passive grout seal assembly according to claim 14, wherein the annular bag comprises two fiber reinforced band sections located at the annular bag top and bottom respectively, and one pure rubber band section between the two fiber reinforced band sections.

16. The passive grout seal assembly according to claim 15, wherein the two fiber reinforced band sections comprise all vertically and continuously oriented fibers.

17. The passive grout seal assembly according to claim 13, wherein the annular bag comprises a fiber reinforced band section with all vertically and continuously oriented fibers.

18. The passive grout seal assembly according to claim 13, wherein the first and second plurality of flexible fixings are a plurality of rubber belt rings, the plurality of fixings at side surfaces of the tapered shim plates are a plurality of hooks, the plurality of connectors are a plurality of tensioned elastic wires in a vertical orientation, with a minimum vertical height of at least one foot, connecting the plurality of hooks and corresponding rubber belt rings.

19. The passive grout seal assembly according to claim 13, wherein the sealed fixing is an annular doubler.

20. A passive grout seal assembly, installed at an annular structure surface below a plurality of tapered shim plates pre-installed on the annular structure surface and near the bottom of an annulus between a sleeve structure and a tubular structure inserting from above, with the assembly radical width less than the radical width of the tapered shim plates, for sealing an annular gap within the annulus during an offshore structure installation, the grout seal assembly comprising:
- a flexible annular fabric bag with sealed sides and bottom installed at the annular structure surface, the annular bag having a plurality of fixings at circular top connected to a plurality of fixings at side surfaces of the tapered shim plates above by a plurality of flexible connectors, the annular bag bottom being connected to a sealed fixing at the annular structure surface;
- a gap self-reducing system installed at the annular structure surface below the annular bag, wherein the gap self-reducing system comprises a plurality of gap reducing substructures circularly arranged, each substructure equipped with at least two components: a flip plate with two supports, kept in a horizontal orientation prior to the offshore installation, and a hinged device, and a plurality of waterproof connecting fabrics placed at the flip plate upper surfaces and between each pair of flip plate lateral sides are utilized for sealing lateral gaps during flip plate tilting actions;
- a planar ring plate fixed at the annular structure surface below the gap self-reducing system; and
- a grout piping system for pouring grout directly into the flexible annular bag during grouting operation.

21. The passive grout seal assembly according to claim 20, wherein the fixings at the annular bag circular top are a plurality of rings, the plurality of fixings at side surfaces of the tapered shim plates are a plurality of hooks, the plurality of connectors are a plurality of tensioned elastic wires in a vertical orientation, connecting the plurality of hooks and corresponding rings.

22. The passive grout seal assembly according to claim 20, wherein the sealed fixing is an annular doubler.

23. The passive grout seal assembly according to claim 20, wherein each flip plate has a height larger than a designed annular gap width.

24. The passive grout seal assembly according to claim 20, wherein the hinged device comprises a pipe for housing a pair of bearings, and a load support bar through a bearing inner hole being supported by a pair of foundations anchored at upper surface of the planar ring plate.

25. The passive grout seal assembly according to claim 20, wherein the offshore structure is a wind turbine structure, the annular bag is a waterproof annular fabric bag, the sleeve structure is a driven sleeve, the tubular structure inserting from above is a supporting leg, the annular structure surface is the supporting leg outer surface, and the grout piping system is installed at the supporting leg inner surface.

26. A passive grout seal assembly, installed at an annular structure surface below a plurality of tapered shim plates pre-installed on the annular structure surface and near the bottom of an annulus between a sleeve structure and a tubular structure inserting from above, with the assembly radical width less than the radical width of the tapered shim plates, for sealing an annular gap within the annulus during an offshore structure installation, the grout seal assembly comprising:
- a flexible annular fabric bag with sealed sides and bottom installed at the annular structure surface, the annular bag having a plurality of fixings at circular top, the annular fabric bag bottom being connected to a sealed fixing at the annular structure surface;
- a gap self-reducing system installed at the annular structure surface below the annular fabric bag, wherein the gap self-reducing system comprises a plurality of gap reducing substructures circularly arranged, each substructure equipped with at least two components: a flip plate with a pair of fixings at top, kept in a near vertical orientation prior to the offshore installation, and a hinged device, and a plurality of waterproof connecting fabrics placed at the flip plate upper surfaces and between each pair of flip plate lateral sides are utilized for sealing lateral gaps during flip plate tilting actions;
- a planar ring plate fixed at the annular structure surface below the gap self-reducing system;
- a plurality of flexible connectors connecting the pair of fixings of each flip plate, the plurality of fixings at the annular fabric bag circular top, and a plurality of fixings at side surfaces of the tapered shim plates above; and
- a grout piping system for pouring grout directly into the flexible annular fabric bag during grouting operation.

27. The passive grout seal assembly according to claim 26, wherein the fixings at the annular fabric bag circular top are a plurality of rings, the plurality of fixings at side surfaces of the tapered shim plates are a plurality of hooks, the pair of fixings at each flip plate top are two half rings, the plurality of connectors are a plurality of tensioned elastic wires in a vertical orientation.

28. The passive grout seal assembly according to claim 26 further comprising a plurality of flexible fixings installed on the plurality of connectors to tie-up the connectors to the plurality of fixings at the annular fabric bag circular top.

29. The passive grout seal assembly according to claim 26, wherein the sealed fixing is an annular doubler.

30. The passive grout seal assembly according to claim 26, wherein each flip plate has a height larger than a designed annular gap width.

31. The passive grout seal assembly according to claim 26, wherein the hinged device comprises a pipe for housing a pair of bearings, and a load support bar through a bearing inner hole being supported by a pair of foundations anchored at upper surface of the planar ring plate.

32. The passive grout seal assembly according to claim 26, wherein the offshore structure is a wind turbine structure, the annular bag is a waterproof annular fabric bag, the sleeve structure is a driven sleeve, the tubular structure inserting from above is a supporting leg, the annular structure surface is the supporting leg outer surface, and the grout piping system is installed at the supporting leg inner surface.

* * * * *